United States Patent
Okamoto et al.

(10) Patent No.: US 8,586,680 B2
(45) Date of Patent: Nov. 19, 2013

(54) RUBBER COMPOSITION FOR GOLF BALL AND GOLF BALL

(75) Inventors: Naomi Okamoto, Ichihara (JP); Mitsuharu Anbe, Ichihara (JP); Takashi Wada, Ichihara (JP)

(73) Assignee: Ube Industries, Ltd. (JP)

( * ) Notice: Subject to any disclaimer, the term of this patent is extended or adjusted under 35 U.S.C. 154(b) by 408 days.

(21) Appl. No.: 11/994,956

(22) PCT Filed: Jun. 26, 2007

(86) PCT No.: PCT/JP2007/062748
§ 371 (c)(1),
(2), (4) Date: Feb. 23, 2010

(87) PCT Pub. No.: WO2008/075473
PCT Pub. Date: Jun. 26, 2008

(65) Prior Publication Data
US 2010/0151965 A1    Jun. 17, 2010

(30) Foreign Application Priority Data
Dec. 20, 2006    (JP) ................................. 2006-342907

(51) Int. Cl.
*C08F 36/00* (2006.01)
*A63B 37/00* (2006.01)

(52) U.S. Cl.
USPC ...................................... 525/331.9; 473/351

(58) Field of Classification Search
USPC ...................................... 525/331.9
See application file for complete search history.

(56) References Cited

U.S. PATENT DOCUMENTS

| | | | |
|---|---|---|---|
| 7,820,763 B2 * | 10/2010 | Okamoto et al. | 525/240 |
| 2002/0052253 A1 * | 5/2002 | Fushihara et al. | 473/371 |

FOREIGN PATENT DOCUMENTS

| | | | | |
|---|---|---|---|---|
| EP | 1 978 057 | | 10/2008 | |
| JP | 63-275356 A | | 11/1988 | |
| JP | 63-332562 | | 11/1990 | |
| JP | 6-80123 B | | 10/1994 | |
| JP | 2001-253062 | | 5/2002 | |
| JP | 2001-354777 | | 5/2003 | |
| JP | 2003-055689 | | 9/2004 | |
| JP | 2004263094 A | * | 9/2004 | ............... C08L 9/00 |
| JP | 2003-088095 | | 10/2004 | |
| JP | 2004292667 A | * | 10/2004 | ............... C08L 9/00 |
| JP | 2006/067961 | | 6/2006 | |
| JP | 2006-241265 | | 9/2006 | |
| WO | 2007/081018 A1 | | 7/2007 | |

OTHER PUBLICATIONS

Translation of JP2004263094, Sep. 2004.*
Translation of JP 2004292667, Oct. 2004.*
Supplementary European Search Report which issued in connection with corresponding European Patent Application No. 07 76 7554 on Oct. 1, 2009.

* cited by examiner

*Primary Examiner* — Hui Chin
(74) *Attorney, Agent, or Firm* — Clark Hill PLC

(57) ABSTRACT

The object is to provide a rubber composition for a high-strength golf ball which has a high hardness, high resiliency, excellent processability and improved filler dispersibility, by adjusting each of the Mooney viscosity, the molecular weight distribution and the n value (the rate-dependent index for Mooney viscosity) of a high-cis-polybutadiene rubber using a cobalt catalyst to a value falling within a specific range. The rubber composition comprises 100 parts by weight of a high-cis-polybutadiene synthesized using a cobalt catalyst and 10 to 50 parts by weight of a co-crosslinking agent, wherein the high-cis-polybutadiene satisfies the following requirements (a) to (c): (a) the Mooney viscosity (ML) is 40 to 55; (b) the molecular weight distribution [a weight average molecular weight MW)/a number average molecular weight (Mn)] is 3.0 to 4.2; and (c) the rate-dependent index of Mooney viscosity (n value) is 2.3 to 3.0.

4 Claims, 1 Drawing Sheet

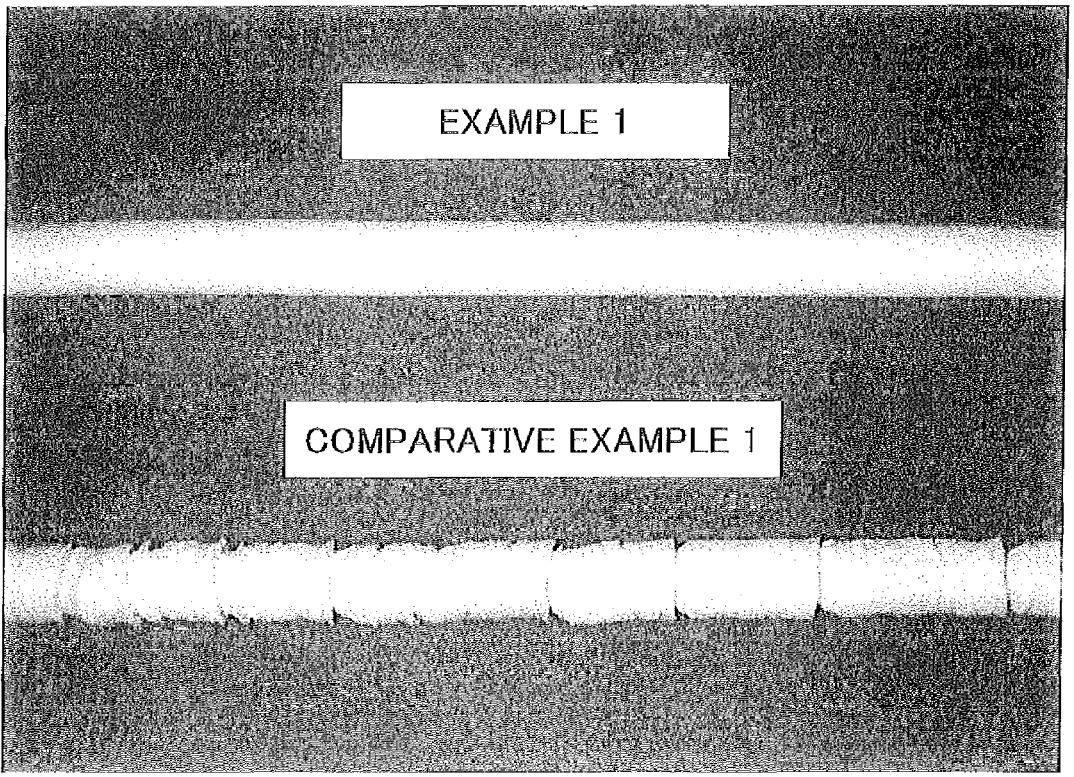

RUBBER COMPOSITION FOR GOLF BALL AND GOLF BALL

CROSS-REFERENCE TO RELATED APPLICATION

This application is a national-stage entry of International Application No. PCT/JP2007/62748, filed Jun. 26, 2007, which claims priority from Japanese Patent Application No. 2006-342907, filed Dec. 20, 2006, the disclosure of both of which are incorporated herein by reference.

TECHNICAL FIELD

The present invention relates to a rubber composition for golf ball, and a gold ball, with excellent processability, large rebound resilience, and high tensile strength.

BACKGROUND ART

A polybutadiene rubber for use in golf balls as a base material rubber is generally required to have high rebound resilience and excellent processability. A higher Mooney viscosity improves rebound resilience but deteriorates processability. A wider molecular weight distribution improves processability but deteriorates repulsion. Thus, there is a tradeoff therebetween. For the purpose of making processability and rebound resilience compatible, improvements in polybutadiene rubbers have been tried and various proposals have been made.

For example, Patent Documents 1 and 2 disclose polybutadiene rubbers synthesized in the presence of a Ni-based catalyst and having a higher Mooney viscosity and a wider molecular weight distribution, and try improvements in durability and rebound resilience. Patent Document 3 discloses a polybutadiene rubber with a cobalt catalyst and having a higher Mooney viscosity, which improves rubber rebound resilience and dimension stability. Patent Document 4 discloses a polybutadiene rubber with a cobalt catalyst and having a lower Mooney viscosity, which improves rubber rebound resilience and processability. Patent Documents 5, 6, and 7 disclose methods of improving rubber rebound resilience and processability by blending a polybutadiene rubber having a lower Mooney viscosity and a polybutadiene rubber having a higher Mooney viscosity with a cobalt catalyst.

Patent Document 1: JP-A 63-275356
Patent Document 2: JP-A 2-177973
Patent Document 3: JP-A 2004-263094
Patent Document 4: JP-A 2004-292667
Patent Document 5: JP-B 6-80123
Patent Document 6: JP-A 2002-143348
Patent Document 7: JP-A 2003-154033

DISCLOSURE OF THE INVENTION

Problem to be Solved by the Invention

Rubber compositions have been still required to have high rebound resilience and excellent processability, and high tensile strength, which three physical properties are excellent at the same time. Then, the present invention has an object to provide a rubber composition suitable for golf balls with high hardness and rebound resilience, and excellent processability, both balanced, with further improved filler dispersion, and high tensile strength.

Means to Solve the Problem

To achieve the above object, the Inventors et al. have intensively studied on the correlation between the n-value derived from the velocity dependence of Mooney viscosity and the processability such as ability incorporated into compound of filler and extrusion and the physical property such as rebound resilience and tensile strength. Consequently, it is found that a high cis-polybutadiene with a cobalt catalyst can be set to have a Mooney viscosity, a molecular weight distribution and an n-value (velocity dependence index of Mooney viscosity) falling within specific ranges, thereby providing a rubber composition for golf balls, and a golf ball, with high hardness and rebound resilience, and excellent extrusion processability, both balanced, with further improved filler dispersion, and high tensile strength. Namely, the present invention is directed to a rubber composition for golf ball, comprising a high cis-polybutadiene synthesized in the presence of a cobalt-based catalyst, and a crosslinking agent mixed by 10-50 weight parts on the basis of 100 weight parts of the high cis-polybutadiene, wherein the high cis-polybutadiene satisfies the requirements of (a) a Mooney viscosity (ML) of 40-55,
(b) a molecular weight distribution [Weight average molecular weight (Mw)/Number average molecular weight (Mn)] of 3.0-4.2, and
(c) a velocity dependence index of Mooney viscosity (n-value) of 2.3-3.0 (the n-value being represented by Expression 2), $$\log(ML) = \log(K) + n^{-1} \times \log(RS) \qquad \text{[Expression 2]}$$

(where RS denotes the number of revolutions of the rotor per minute, and K an arbitrary number).

The present invention is also directed to a golf ball comprising a rubber base material having the above-described rubber composition for golf balls.

Effect of the Invention

As described above, the present invention is able to provide a rubber composition for golf balls, and a golf ball, with high hardness and rebound resilience, and excellent extrusion processability, both balanced, with further improved filler dispersion, and high tensile strength.

THE BEST MODE FOR CARRYING OUT THE INVENTION

In the rubber composition for golf balls according to the present invention, the high cis-polybutadiene synthesized in the presence of a cobalt-based catalyst has the following properties.

The Mooney viscosity is 40-55, preferably 43-52, more preferably 44-49. A lower Mooney viscosity than 40 lowers rebound resilience while a higher one than 55 deteriorates processability undesirably.

The molecular weight distribution (Weight average molecular weight (Mw)/Number average molecular weight (Mn)) falls within 3.0-4.2, preferably 3.4-4.0, and more preferably 3.5-3.8. If the molecular weight distribution is larger than the above range, the rebound resilience may lower. If it is smaller larger than the above range, the processability may worsen undesirably.

The high cis-polybutadiene has preferably a Mw of 500-750 thousands and a Mn of 120-250 thousands, more preferably a Mw of 580-720 thousands and a Mn of 150-190 thousands, and particularly preferably a Mw of 600-700 thousands and a Mn of 170-180 thousands. A lower molecular weight than a Mw of 500-750 thousands and a Mn of 120-250 thousands prevents achievement of sufficient rebound resilience while a higher one deteriorates processability undesirably.

The velocity dependence index of Mooney viscosity, or the n-value, is 2.3-3.0, preferably 2.4-2.9, and more preferably 2.4-2.8. The n-value undesirably deteriorates the ability incorporated into compound of filler if smaller than 2.3 and lowers rebound resilience if large than 3.0.

The n-value is determined by the branch degree and the molecular weight distribution of the polybutadiene and is not correlated with the Mooney viscosity. A larger branch degree or molecular weight distribution of the polybutadiene results in a larger n-value while a smaller branch degree or molecular weight distribution results in a smaller n-value.

The ratio (Tcp/ML) of the 5% toluene solution viscosity (Tcp) to the Mooney viscosity (ML) prefers 2.5-3.5, more preferably 2.6-3.2, and particularly preferably 2.7-3.1. A smaller (Tcp/ML) than 2.5 lowers the rebound resilience and a larger one than 3.5 increases the cold flow property undesirably.

The cis-1,4 structure content in the high cis-polybutadiene is preferably 95% or above, and particularly preferably 97% or above. If the cis-1,4 content is lower than the above, the rebound resilience lowers undesirably.

A proportion of the contained cis-1,4 structure can be measured through a microstructure analysis. For example, an infrared absorption spectrum analysis can be applied. The cis and trans structures have respective different absorbed intensities. Accordingly, the proportion can be calculated from the ratio therebetween.

The high cis-polybutadiene having the above-described properties can be synthesized through polymerization of a 1,3-butadiene monomer. Other than the butadiene monomer, the following may be contained more than at least one by a small amount: conjugate dienes such as isoprene, 1,3-pentadiene, 2-ethyl-1,3-butadiene, 2,3-dimethylbutadiene, 2-methylpentadiene, 4-methylpentadiene, and 2,4-hexadiene; non-cyclic monoolefins such as ethylene, propylene, butene-1, butene-2, isobutene, pentene-1,4-methylpentene-1, hexene-1, and octene-1; cyclic monoolefins such as cyclopentene, cyclohexene, and norbornene; aromatic vinyl compounds such as styrene, and α-methylstyrene; and nonconjugate dienes such as dicyclopentadiene, 5-ethylidene-2-norbornene, and 1,5-hexadiene.

Polymerization methods are not limited particularly. For example, bulk polymerization using a conjugate diene compound monomer itself, such as 1,3-butadiene, as a polymerization solvent, and solution polymerization may be applicable. Examples of the solvent in the solution polymerization include aromatic hydrocarbons such as toluene, benzene, and xylene; aliphatic hydrocarbons such as n-hexane, butane, heptane, and pentane; alicyclic hydrocarbons such as cyclopentane, and cyclohexane; olefin hydrocarbons such as the above olefin compounds, cis-2-butene, and trans-2-butene; hydrocarbon-based solvents such as mineral sprit, solvent naphtha, and kerosene; and halogenated hydrocarbon-based solvents such as methylene chloride.

Among those, toluene, cyclohexane, or a mixture of cis-2-butene with trans-2-butene can be employed suitably.

A polymerization temperature falls preferably within a range between −30° C. and 150° C., and more particularly within a range between 30° C. and 100° C. A polymerization period of time preferably falls within a range between one minute and 12 hours, and more particularly within a range between five minutes and five hours.

Polymerization requires a cobalt-based catalyst. An example of the cobalt-based catalyst composition may include a catalytic system composed of (A) a cobalt compound, (B) a halogen-containing organoaluminum compound, and (C) water.

The cobalt compound preferably employs a salt of or a complex of cobalt. Particularly preferable examples include cobalt salts such as cobalt chloride, cobalt bromide, cobalt nitrate, cobalt octylate (ethylhexanoate), cobalt naphthenate, cobalt acetate, and cobalt malonate; cobalt bisacetylacetonate, and cobalt trisacetylacetonate; acetoacetic acid ethyl ester cobalt; organic basic complexes such as a pyridine complex or picoline complex of a cobalt salt; and an ethyl alcohol complex.

Examples of the halogen-containing organoaluminum include trialkyl aluminum or dialkyl aluminum chloride, dialkyl aluminum bromide, alkyl aluminum sesquichloride, alkyl aluminum sesquibromide, and alkyl aluminum dichloride.

Examples of specific compounds include trialkyl aluminum such as trimethyl aluminum, triethyl aluminum, triisobutyl aluminum, trihexyl aluminum, trioctyl aluminum, and tridecyl aluminum.

They further include dialkyl aluminum chlorides such as dimethyl aluminum chloride, and diethyl aluminum chloride; organoaluminum halides such as sesquiethyl aluminum chloride, and ethyl aluminum dichloride; and hydrogenated organoaluminum halides such as diethyl aluminum hydride, diisobutyl aluminum hydride, and sesquiethyl aluminum hydride. These organoaluminum compounds may be used in combination of two or more.

A molar ratio (B)/(A) between the component (A) and the component (B) is preferably 0.1-5000, and more preferably 1-2000.

A molar ratio (B)/(C) between the component (B) and the component (C) is preferably 0.7-5, more preferably 0.8-4, and particularly preferably 1-3.

After polymerization for a certain period of time, the inside of the polymerization vessel is subjected to post treatments such as steps of depressurizing, cleaning, and drying, if required, to obtain a high cis-polybutadiene.

The high cis-polybutadiene can be obtained through the above polymerization. In this case, the operation of the range of the n-value may be performed in two stages as follows because optimization of the molecular weight distribution is also required. First, in the polymerization stage, several types of polybutadienes with smaller n-values and different molecular weights are polymerized as above. Next, the above several types of polybutadienes with different molecular weights are blended together to widen the molecular weight distribution, thereby obtaining a high cis-polybutadiene with an n-value adjusted within an optimum range. The n-value in the polymerization stage can be adjusted with a mixture molar ratio of organoaluminum compound as a co-catalyst to water. Namely, the amount of water added to a certain amount of the organoaluminum compound is increased to reduce the mixture molar ratio. As the mixture molar ratio lowers, the n-value tends to lower as well. In this case, the mixture molar ratio of organoaluminum compound as the co-catalyst to water in the polymerization stage (Organoaluminum compound/Water) is preferably 2.0 or below, and particularly preferably 1.0-1.5. A higher mixture molar ratio than 2.0 increases the n-value excessively and a lower one than 1.0 may remarkably lower the polymerization activity undesirably.

The rubber composition for golf balls according to the present invention includes a crosslinking agent mixed by 10-50 weight parts on the basis of 100 weight parts of the high cis-polybutadiene having the above-described properties.

The crosslinking agent mixed in the rubber composition is preferably one of monovalent or divalent metallic salts of α,β-ethylenic unsaturated carboxylic acid. Specific examples thereof include zinc diacrylate, basic zinc methacrylate, and zinc dimethacrylate. These metallic salts of α,β-ethylenic unsaturated carboxylic acid may be mixed as it is with the high cis butadiene in general methods. In another method, a metal oxide such as zinc oxide is previously kneaded in the high cis-polybutadiene. In addition, an α,β-ethylenic unsaturated carboxylic acid such as acrylic acid and methacrylic acid may be added and mixed therein to achieve the reaction of the α,β-ethylenic unsaturated carboxylic acid with the metal oxide to obtain a metallic salt of α,β-ethylenic unsaturated carboxylic acid.

The amount of the mixed crosslinking agent falls within 10-50 weight parts on the basis of 100 weight parts of the high cis-polybutadiene. If the amount of the mixed crosslinking agent is less than the above range, crosslinking can not proceed sufficiently, resulting in lowered reboundresilence, shortened carries, and worsened durability. If the amount of the mixed crosslinking agent is more than the above range, the compression becomes too large and accordingly the feeling of impact worsens.

Preferably, in the present invention, in addition to the above-described crosslinking agent, peroxides are mixed as essential components in the rubber composition.

The peroxides act as initiators for crosslinking, grafting or polymerizing the rubber or the crosslinking agent. Suitable specific examples of the peroxides include dicumil peroxide, 1,1-bis(t-butylperoxy)3,3,5-trimethyl cyclohexane, and so forth.

Preferably, the amount of the mixed peroxides falls within 0.2-5 weight parts on the basis of 100 weight parts of the high cis-polybutadiene. If the amount of the mixed peroxides is smaller than the above range, crosslinking and so forth can not proceed sufficiently, resulting in lowered rebound resilience, shortened carries, and worsened durability. If the amount of the mixed peroxides is larger than the above range, over-cure (over crosslinking) occurs, resulting in increased fragileness and worsened durability.

The rubber composition may be mixed with zinc oxide also acting as a crosslinking coagent if the crosslinking agent is zinc diacrylate or zinc methacrylate. Further, a filler such as barium sulfate, an anti-oxidant, and/or an additive such as zinc stearate may be mixed, if required.

The golf ball according to the present invention includes the above-described rubber composition for golf balls as a rubber base material and accordingly it is excellent in hardness, rebound resilience, and extrusion processability.

EXAMPLES

Examples based on the present invention will be described below specifically.

A cis-1,4structure content was identified in the infrared absorption spectrum analysis. A microstructure was calculated from the absorbed intensity ratio at cis 740 cm$^{-1}$, trans 967 cm$^{-1}$, and vinyl 910 cm$^{-1}$.

A molecular weight (Mw, Mn) was measured in a GPC method: HLC-8220 (available from Toso Inc.) and calculated by standard polystyrene conversion.

A toluene solution viscosity (Tcp) was measured on 2.28 g of a polymer dissolved in 50 ml of toluene at 25° C. using a Canon-Fenske viscometer No. 400 with a viscometer calibration standard solution (JIS Z8809) as the standard solution.

A raw rubber Mooney viscosity ($ML_{1+4}$, 100° C.) was measured based on JIS 6300.

An n-value is the reverse of the gradient of a straight line derived by Expression 3 based on JIS 6300 from the Mooney viscosity (ML) and the number of revolutions of the rotor (RS), the Mooney viscosity being measured while varying the revolution speed of the rotor (1/minute). In this case, log (K) denotes an arbitrary number that means a intercept of the straight line.

$$\log(ML)=\log(K)+n^{-1}\times\log(RS) \quad \text{[Expression 3]}$$

Expression 3 can be derived based on a theoretical equation of an n-power law (Expression 4) for non-Newtonian flow.

$$\gamma=k\tau^n \quad \text{[Expression 4]}$$

(where γ: velocity gradient, τ: shear stress, $k^{-1}=\eta$: viscosity coefficient)

Ability incorporated into compound of filler was measured by winding a raw rubber around a 6-inch roll and measuring the period of time after the filler is fed until it is mixed, and estimated by an index (reference value) relative to 100 of Comparative Example 1. The smaller the index, the shorter and better the period of time of mixing the filler becomes.

A die swell measurement was used for estimating the dimension stability that is one of indexes indicative of the rubber processability. The measurement used a MPT (processability tester available from Monsanto Inc.) to form an extrusion under the condition at a temperature of 80° C., with a die (D=3 mm, L/D=12), at a shear speed of 100 sec$^{-1}$. The die swell was calculated from a section of the extrudate and estimated by an index (reference value) relative to 100 of Comparative Example 1. The smaller the index, the better the dimension stability becomes. The surface condition of the extrudate was visually estimated as Excellent (○), Melt fracture (Δ), and Heavy melt fracture (×).

Hardness was measured in accordance with a measuring method stipulated in JIS-K6253 using a durometer (type D) and estimated by an index (reference value) relative to 100 of Comparative Example 1. The larger the index, the higher the hardness becomes.

A tensile strength was measured in accordance with a measuring method stipulated in JIS-K6251 using a No. 3 dumbbell at a tensile rate of 500 mm/min and estimated by an index (reference value) relative to 100 of Comparative Example 1. The larger the index, the higher and better the tensile strength becomes.

Rebound resilience was measured in accordance with a measuring method stipulated in JIS-K6251 in a tripso test and estimated by an index (reference value) relative to 100 of Comparative Example 1. The larger the index, the higher and better the rebound resilience becomes.

Examples 1-4 and Comparative Examples 1-6

First, cis-polybutadienes (Polymerization Examples 1-5) were produced for use in Examples of the rubber composition for golf balls according to the present invention and Comparative Examples. An agitator-equipped, stainless steel reaction vessel having an inner volume of 1.5 L replaced with a nitrogen gas was prepared. Then, 1.0 L of a polymerization solution (31.5 wt % of butadiene; 28.8 wt % of 2-butens; and 39.7 wt % of cyclohexane) was fed into the vessel. Thereafter, 2.2 mmol of water, 2.9 mmol of diethyl aluminum chloride (a mixture molar ratio of Organoaluminum/Water=1.3), a varied quantity of cyclooctadiene (COD), and 0.005 mmol of cobalt octoate were added, followed by agitation at 60° C. for 20 minutes to execute 1,4-cis polymerization. Ethanol solution was added to the resultant as an anti-oxidant to terminate the polymerization. Thereafter, the unreacted butadiene and 2-butenes were evaporated and removed to obtain a cis-polybutadiene. Table 1 shows cis-polybutadienes according to Polymerization Examples 1-5, which were obtained by varying the quantity of cyclooctadiene (COD).

TABLE 1

|  | COD (mmol) | Intrinsic Viscosity [η] | Mooney Viscosity | 5% Toluene Solution Viscosity | n-value |
|---|---|---|---|---|---|
| Polymerization Example 1 | 0.8 | 3.5 | — | — | — |
| Polymerization Example 2 | 3.2 | 2.6 | 60 | 156 | 2.0 |
| Polymerization Example 3 | 4.0 | 2.5 | 52 | 130 | 2.0 |
| Polymerization Example 4 | 16.0 | 1.7 | 27 | 68 | 1.9 |
| Polymerization Example 5 | 64.0 | 0.8 | — | — | — |

Next, the cis-polybutadienes according to Polymerization Examples 1-5 were dissolved and blended in cyclohexane in proportions shown in Table 2 and then the cyclohexane was evaporated and removed to obtain mixed cis-polybutadienes according to Samples A-E.

TABLE 2

|  | Sample A | Sample B | Sample C | Sample D | Sample E |
|---|---|---|---|---|---|
| Polymerization Example 1 | 27 | 23 | 18 | 13 | 25 |
| Polymerization Example 2 | — | — | — | — | 50 |
| Polymerization Example 3 | 50 | 60 | 70 | 80 | — |
| Polymerization Example 4 | — | — | — | 25 | — |
| Polymerization Example 5 | 23 | 17 | 12 | 7 | — |

Next, the mixed cis-polybutadienes (BR) according to Samples A-D were employed as Examples 1-4 while commercially available cis-polybutadienes (BR150, BR230, BR150B, BR150L and BR700 are all available from Ube Industries) and the mixed cis-polybutadiene according to Sample E were employed as Comparative Examples 1-6. Physical properties of these raw rubbers (BR) were measured. On the basis of the compounding formula shown in Tables 3 and 4, a 6-inch roll (available from Yasuda Seiki Inc.) was used, the temperature was set at 40° C., and a raw rubber (BR) was wound around the roll. One minute later, a mixture of zinc acrylate and zinc oxide (ZnO) with an anti-oxidant is fed little by little, and the period of time required to mix the whole amount was measured to estimate the ability incorporated into compound of filler. Next, dicumil peroxide (DCP) was additionally mixed and kneaded to measure extrusion properties of the rubber compositions according to Examples and Comparative Examples. Then, the rubber compositions were each supplied into a certain mold and press vulcanized at 155° C. for 15 minutes to measure the vulcanized physical properties of the rubber compositions according to Examples and Comparative Examples. These results are shown in Tables 3 and 4.

TABLE 3

|  |  | Examples | | | |
|---|---|---|---|---|---|
|  |  | 1 | 2 | 3 | 4 |
| BR sample name |  | A | B | C | D |
| Raw Rubber | (1) | 40 | 44 | 47 | 52 |
| Property | (2) | 2.5 | 2.5 | 2.6 | 2.7 |
|  | (3) | 98 | 98 | 98 | 98 |
|  | Mw ($10^4$) | 57 | 60 | 64 | 72 |
|  | Mn ($10^4$) | 17 | 17 | 18 | 18 |
|  | Mw/Mn | 3.4 | 3.5 | 3.6 | 4.0 |
|  | (4) | 103 | 123 | 139 | 165 |
|  | Tcp/ML | 2.6 | 2.8 | 3.0 | 3.2 |
| Processability | (5) | 86 | 85 | 87 | 88 |
|  | (6) | ○ | ○ | ○ | Δ |
|  | (7) | 94 | 95 | 95 | 96 |
| Vulcanized | (8) | 100 | 102 | 102 | 104 |
| Physical | (9) | 105 | 107 | 106 | 106 |
| Property | (10) | 103 | 104 | 104 | 105 |

(1) Moony viscosity (ML)
(2) n-value
(3) Cis-1,4structure content (%)
(4) 5% Toluene solution viscosity (Tcp)
(5) ability incorporated into compound of filler
(6) Extrusion property Surface condition
(7) Die swell
(8) Hardness
(9) Tensile strength
(10) Rebound resilience

| Compounding Formula | | |
|---|---|---|
| BR | 100 | |
| Zinc acrylate | 30 | ACTOR ZA from Kawaguchi Chemical |
| ZnO | 20 | Zinc oxide |
| Anti-oxidant | 0.5 | NOCRAC NS-5 from Ohuchi Shinko |
| DCP | 2 | Dicumil peroxide |

155° C. × 15 min press cure

TABLE 4

|  |  | Comparative Examples | | | | | |
|---|---|---|---|---|---|---|---|
|  |  | 1 | 2 | 3 | 4 | 5 | 6 |
| BR sample name |  | BR150 | BR230 | E | BR150B | BR150L | BR700 |
| Raw Rubber | (1) | 44 | 38 | 60 | 40 | 43 | 38 |
| Property | (2) | 3.1 | 3.4 | 2.2 | 4.2 | 2.1 | 2.3 |
|  | (3) | 97 | 97 | 98 | 97 | 98 | 98 |
|  | Mw ($10^4$) | 54 | 63 | 67 | 50 | 52 | 51 |
|  | Mn ($10^4$) | 20 | 14 | 25 | 16 | 22 | 19 |
|  | Mw/Mn | 2.7 | 4.5 | 2.6 | 3.2 | 2.4 | 2.7 |
|  | (4) | 75 | 117 | 180 | 48 | 105 | 87 |
|  | Tcp/ML | 1.8 | 3.1 | 3.3 | 1.2 | 2.4 | 2.3 |
| Processability | (5) | 100 | 95 | 118 | 105 | 102 | 92 |
|  | (6) | X | Δ | X | X | X | Δ |
|  | (7) | 100 | 105 | 92 | 106 | 95 | 97 |

TABLE 4-continued

|  |  | Comparative Examples | | | | | |
|---|---|---|---|---|---|---|---|
|  |  | 1 | 2 | 3 | 4 | 5 | 6 |
| Vulcanized | (8) | 100 | 98 | 104 | 98 | 101 | 99 |
| Physical | (9) | 100 | 97 | 102 | 97 | 102 | 100 |
| Property | (10) | 100 | 95 | 104 | 96 | 102 | 99 |

(1) Moony viscosity (ML)
(2) n-value
(3) Cis-1,4structure content (%)
(4) 5% Toluene solution viscosity (Tcp)
(5) ability incorporated into compound of filler
(6) Extrusion property Surface condition
(7) Die swell
(8) Hardness
(9) Tensile strength
(10) Rebound resilience

| Compounding Formula | | |
|---|---|---|
| BR | 100 | |
| Zinc acrylate | 30 | ACTOR ZA from Kawaguchi Chemical |
| ZnO | 20 | Zinc oxide |
| Anti-Oxidant | 0.5 | NOCRAC NS-5 from Ohuchi Shinko |
| DCP | 2 | Dicumil peroxide |

155° C. × 15 min press cure

It can be found from the foregoing that the rubber compositions in Examples 1-4 have higher hardness and rebound resilience and better processability, both balanced, with further improved filler dispersion and higher tensile strength than those in Comparative Examples 1-6.

As can be seen from a photograph in FIG. 1 showing surface conditions of the extrusions of Example 1 and Comparative Example 1, Example 1 is better in surface condition than Comparative Example 1.

BRIEF DESCRIPTION OF THE DRAWINGS

[FIG. 1] is a photograph showing surface conditions of the extrusions of Example 1 and Comparative Example 1.

The invention claimed is:

1. A rubber composition for golf ball, comprising a high cis-polybutadiene adjusted by blending high cis-polybutadienes of several types synthesized in the presence of a cobalt-based catalyst, and a crosslinking agent mixed by 10-50 weight parts on the basis of 100 weight parts of the high cis-polybutadiene, the high cis-polybutadienes each having a cis content of 95% or higher,
   wherein the high cis-polybutadiene satisfies the requirements of
   (a) a Mooney viscosity (ML) of more than 40 and not more than 55,
   (b) a molecular weight distribution [Weight average molecular weight (Mw)/Number average molecular weight (Mn)] of 3.0-4.2,
   (c) a velocity dependence index of Mooney viscosity (n-value) of 2.3-3.0 (the n-value being represented by Expression 1), and
   (d) a ratio (Tcp/ML) of 2,5-3,5 between a 5% toluene solution viscosity (Tcp) and a Mooney viscosity (ML), $$\log(ML)=\log(K)+n^{-1}\times\log(RS) \quad \text{[Expression 1]}$$

where RS denotes the number of revolutions of the rotor per minute, and K is an arbitrary number.

2. The rubber composition for golf ball according to claim 1, wherein the high cis-polybutadiene has a Mw of 500-750 thousands and a Mn of 120-250 thousands.

3. A golf ball including a rubber base material having the rubber composition for golf ball according to claim 1.

4. A golf ball including a rubber base material having the rubber composition for golf ball according to claim 2.

* * * * *